Nov. 15, 1966   D. B. PRICE   3,285,158
AUTOMATIC BEVERAGE MAKER
Filed Nov. 14, 1963
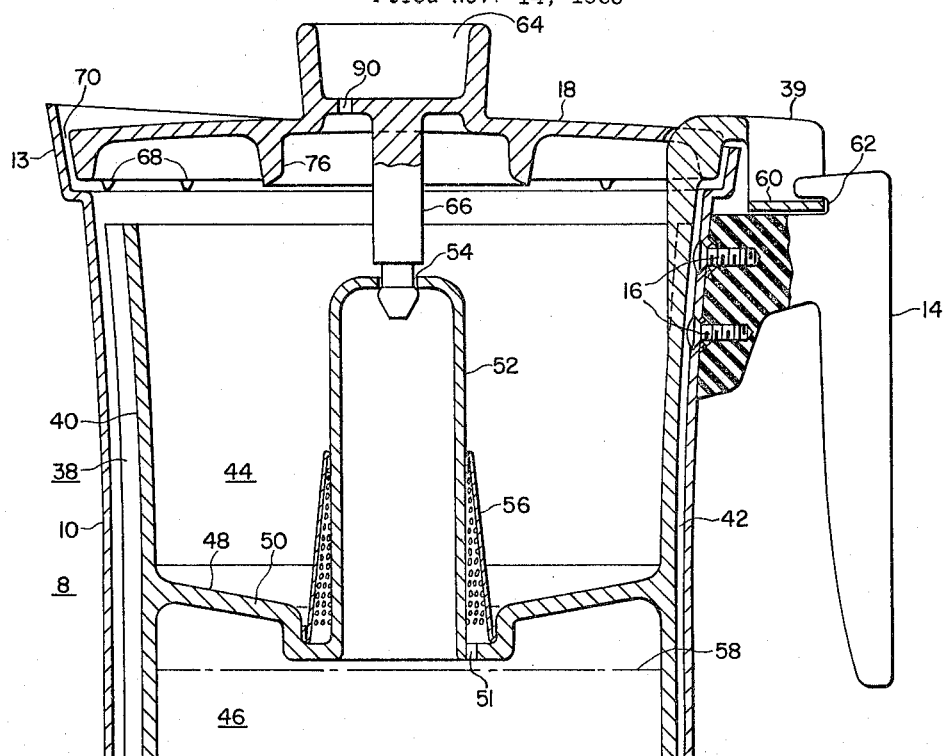
Fig.1.
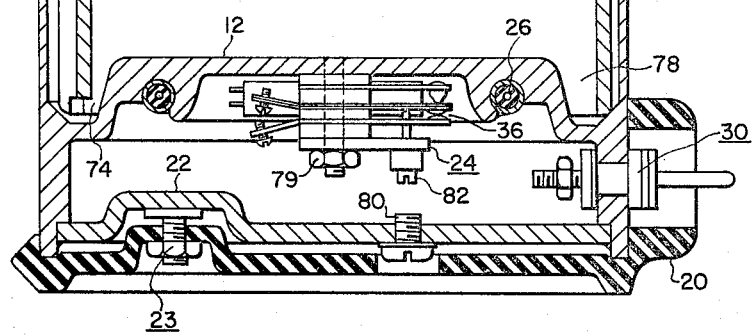
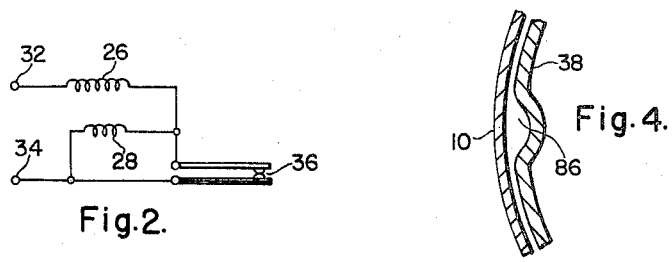
Fig.2.
Fig.4.
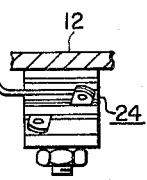
Fig.3.

es Patent Office 3,285,158
Patented Nov. 15, 1966

3,285,158
AUTOMATIC BEVERAGE MAKER
David B. Price, Washington Township, Mansfield, Ohio, assignor to Westinghouse Electric Corporation, East Pittsburgh, Pa., a corporation of Pennsylvania
Filed Nov. 14, 1963, Ser. No. 323,721
8 Claims. (Cl. 99—281)

The present invention relates to automatic beverage makers, and more particularly to automatic coffee or tea makers utilizing a drip brewing cycle.

Many automatic beverage makers are presently on the market. Most of these beverage makers, however, are for brewing coffee according to a percolating cycle. Very few automatic beverage makers using a drip cycle are available. Moreover, very few, if any, automatic tea makers are presently available. Because of the improved quality of brew obtained with a drip cycle, it would be very advantageous to provide such an automatic coffee or tea maker and having such a capacity to be used in the average household.

It is, therefore, an object of the present invention to provide a new and improved automatic beverage maker.

It is a further object of the present invention to provide a new and improved coffee or tea maker utilizing a drip brewing cycle.

It is a further object of the present invention to provide a new and improved coffee or tea maker utilizing a drip cycle in which the bevareg may be poured from the maker without removing any of the internal vessels.

These and other objects and advantages of the present invention will become more apparent when considered in view of the following specification and drawings, in which:

FIGURE 1 is a side sectional view of the beverage maker of the present invention;

FIGURE 2 is a schematic diagram of the electrical control circuit as utilized in the present invention;

FIGURE 3 is a sectional view showing a portion of the warming heater and thermostat structure; and FIGURE 4 is a sectional view taken along the line IV—IV of FIGURE 1 and showing the pouring channel as used in the beverage maker.

Broadly, the present invention provides a beverage maker in which an outer vessel has disposed therein an inner vessel, with a space being formed between the two vessels. The inner vessel has a bottom chamber and a top chamber, with a drain hole being provided in the wall separating the two chambers. As a liquid is heated in the bottom chamber, it is evacuated of the liquid placed therein to pass through the space between the two vessels up into the upper chamber, where it passes through coffee or tea being brewed and down through the drain hole into the bottom chamber again. A top is provided to seal the vessels, and a pouring channel is provided so that the brewed beverage may be served without the necessity of removing the inner vessel.

Referring now to FIGURE 1, the beverage maker of the present invention is shown including an outer vessel 8 having an outer wall 10, a bottom wall 12 and being open at the top. The outer vessel 8 is slightly flared outwardly at the top to form a pouring lip 13 and is of substantially a cylindrical shape. A handle 14 for gripping and pouring is secured to the outer wall 10 of the outer vessel 8 by the screws 16. A cover 18 fits over the top open end of the outer vessel 18. The bottom end of the outer vessel 8 fits into a base member 20. At the bottom end of the outer vessel 8, below the bottom wall 12, is provided a bottom cover 22 which fits around the inside of the outer wall 10 of the outer vessel. The bottom cover 22 is secured to the base member 20 by a bolt assembly 23. Within the cavity formed between the bottom wall 12 of the outer vessel and the bottom cover 22, a thermostat assembly 24 is disposed. A high wattage tubular heater element 26 is placed adjacent the bottom side of the bottom wall 12 of the outer vessel 8. A warming heater element 28 is also disposed near the wall 12, see FIGURE 3. Both of the elements 26 and 28 may be of the wound coil, sheath type and energized from an external source, not shown, for example, 120 volt, 60 cycle power available locally. The local power is applied through a probe contact assembly 30, which is disposed in an aperture in the base member 20 and extends into the cavity between the bottom cover 22 and the bottom wall 12.

FIGURE 2 shows the electrical connections for the thermostat operation, with the input voltage being applied across the terminals 32 and 34. In series with the terminals 32 and 34 is the high wattage heater element 26 and the low wattage warming element 28. A set of thermostat contacts 36 are connected in series with the high wattage heating element 26 and in parallel with the low wattage warming element 28. During the heating or brewing part of the cycle, the contacts 36 are closed. A circuit is thus provided directly through the high wattage element 26, the warming element 28 being shorted out. When the brewing cycle is completed, contacts 36 open to place the warming element 28 also in the circuit. With both the warming element 28 and the heating element 26 in the circuit less heating action is provided thereby maintaining the beverage within the container at a predetermined warm state.

An inner vessel 38 having a substantially cylindrical outer wall 40 is placed within the outer vessel with a space 42 being formed between the wall 10 of the outer vessel 8 and the wall 40 of the inner vessel 38. A locking handle 39 is provided at the top of the inner vessel 38. The inner vessel 38 is divided into an upper chamber 44 and a bottom chamber 46 by a separator wall 48. The upper chamber 44 functions as an infusion chamber and the bottom chamber functions as a pressure chamber. The separator wall has a concave bottom portion 50 into which ground coffee or loose tea is placed in the brewing operation. A drain hole 51 is provided in the bottom portion 50. Extending in omega shape from the concave bottom portion 50 is a upwardly extending vent portion 52. At the top of the vent portion is an aperture 54. Placed around the vent portion 52 is a screen filter 56, which rests upon the bottom portion 50 of the separator wall 48 and covers the drain hole 51.

With the inner vessel 38 and the top cover 18 removed, the outer vessel is filled to, for example, a level 58, with water. The inner vessel 38, with the filter screen 56 in place, is inserted into the outer vessel and locked into position by rotating the inner vessel 38 with respect to the outer vessel so that a horizontal segment 60 of the inner vessel handle 39 slides into a horizontal slot 62 of the handle 14. While inserting the inner vessel 38, any air trapped within the lower chamber 46 is permitted to escape through the aperture 54 in the vent portion 52 of the separator wall 48. This, thus, allows the inner vessel 38 to sink into the water within the lower chamber 46 without displacing the water.

A knob portion 64 of the cover 18 may include a standard coffee measure to assist the user in selecting the proper measurement of coffee. The cover 18 has a cover extension 66 which extends downwardly from the cover 18 into the upper chamber 44. When the cover 18 is inserted onto the maker, the extension 66 extends into the aperture 54 in the vent portion 52, with the lower tip of the extension snapping into the vent aperture 54. The cover 18 is thus held in place while the vent aperture 54 is also closed in preparation for the brew cycle. The cover 18 is spaced away from the outer pouring lip 13 of the outer vessel by the spacing ribs 68 extending downwardly to engage the inner wall of the outer vessel 8. The spacing ribs thus leave a space between the cover 18 and the pouring lip 13 so that the brewed liquid may later be poured from an opening 70.

During the brewing part of the cycle, the thermostat contacts 36 are closed to energize the high wattage heater coil 26, see FIGURE 2, from an external source. The heater coil 26 is disposed contiguously to and below the lower wall 12 of the outer vessel. The heater coil 26 is held in place by swaging the bottom portion of the wall 12 around the heater coil 26, for example. As the water is being heated at temperatures below boiling, any vapor pressure built up is relieved through the drain hole 51 of the separator wall 48.

When the water being heated in the lower chamber 46 reaches the boiling temperature, the vapor pressure begins to rise rapidly, overcoming the vent capacity of the drain hole 51 and thus causing the lower pressure chamber 46 to be evacuated. The water is forced downwardly and out through an opening 74 between the outer wall 40 of the inner vessel 38 and the bottom wall 12 of the outer vessel 8. This opening permits water to pass from the lower chamber 46 into the space 42 between the outer and inner vessels. The water is forced up through the space 42 and spills over the top rim of the inner vessel 38 and into the upper infusion chamber 44, as shown by the dotted arrows. Some of the water is deflected by the cover 18 into the upper chamber 44, with a cover ring projection 76 aiding in this deflection. It should be noted that the design relationship between the cover 18 and the outer vessel is important so that sufficient baffling is provided to prevent the water from pumping out of the device but still leaving sufficient space 70 between the cover and vessel to permit pouring of the beverage.

The transfer of water from the pressure chamber 46 to the infusion chamber 44 leaves the bottom chamber 46 evacuated of water except around the periphery 78 at the bottom of the chamber. The high wattage heater 26 being adjacent the lower wall 12 causes this wall to suddenly overheat to exceed the calibration of the thermostat assembly 24, which is held in intimate contact to the bottom wall 12 by a bolt 79. The calibration of the thermostat may be adjusted by removing a bolt 80 from the bottom cover 22 to permit access into the thermostat cavity and adjust the set screw 82. The calibration of the thermostat is set to permit the water to be heated to the boiling temperature. With the water evacuaed from the lower chamber 46, the bottom wall 12 will quickly exceed the boiling temperature and cause the set of thermostat contacts 36 to open, see FIGURE 2. By opening the contact 36, the warming element 28 is switched into the circuit along with the heating element 26. As can better be seen by FIGURE 3, the heating element 26 is placed near the thermostat assembly 24 so that the contacts 36 are prevented from reclosing.

Steam present in the lower chamber 46, due to the cooling effect of the high wattage element 26 being disconnected from directly across the line and being placed in series with the high resistance, low wattage warming element 28, now condenses and air is drawn into this chamber to restore it to atmospheric pressure. The heated water present in the upper chamber 44 extracts the tea or coffee and begins to pass through the filter screen 56 and the drain hole 51 back into the lower chamber 46. The time for complete draining through the drain hole 51 will of course depend upon the size of this hole and may be made adjustable to establish different brewing strengths.

The brewing cycle is completed with the beverage being filtered through the screen 56, through the drain hole 51, into the bottom chamber 46 and is ready for serving.

The beverage may be poured from the coffee maker by tipping the outer vessel. Upon being poured, the beverage passes through the opening 74, between the walls 38 and 10, and passes upwardly through a concave channel 86, shown in FIGURE 4. The beverage passes up through the concave channel 86 and through the pouring passage 70 between the pouring lip 13 and the cover 18. The concave channel 86 extends along the entire height of the inner vessel 38 in order to provide a sufficient volume for pouring. Moreover, by providing such a passageway from the bottom to the top, the beverage may be poured without removing the inner vessel 38 or coffee or tea grounds from the upper chamber 44.

The spacing 40 between the inner and outer vessels may be varied in order to change the velocity at which the water is pumped into the top chamber 44. To increase the agitation of the coffee grounds or tea leaves and thereby improve extraction, it is desirable to keep this area small in order to brew a high quality beverage. A vent 90 opening is provided in the knob portion 64 of the cover 18 to permit steam to escape during the pumping process so that pressure is relieved under the cover 18 that otherwise might cause water to be expelled from the maker.

A water tight chamber for the thermostat assembly 24 and heaters 26 and 28 is provided, for example, by utilizing an aluminum impact extrusion, for the outer vessel 8, with the bottom cover 22 being welded thereto. The terminal assembly 30 is so fitted into the outer vessel and sealed to permit immersion of the entire unit into water for cleaning.

The cover 18 and the inner vessel 38 may, for instance, be molded from polypropylene which has good heat insulating characteristics. These characteristics are necessary for the inner vessel to prevent condensation of steam generated within the lower chamber 46 before the water has been completely evacuated to the upper chamber 44.

The wattage applied to the heater 26 should be high in order to increase the agitation and thereby improve the quality of brew extraction. It should also be noted that no gaskets or seals are required to provide a completely immersible beverage maker. Additional drain holes besides the hole 51 may be provided in the separator wall 48. These holes may be of very small diameter to permit steam to rise therethrough into the upper chamber and bubble through the brew and therefore improve extraction from the coffee or tea within the upper chamber 44.

Although the present invention has been described with certain degree of particularity, it should be understood that the present disclosure has been made only by way of example and that numerous changes in the details of construction and the combination and arrangement of parts may be resorted to without departing from the scope and spirit of the present invention.

I claim as my invention:

1. An automatic beverage maker including, an outer vessel to contain a liquid having an outer wall, and a bottom wall raised in its central portion to provide an annular trough at its periphery, and being open at the top; a handle fixed to the outer wall of said outer vessel; an inner vessel to be disposed within said outer vessel and having an outer wall with a bottom edge received in said annular trough, said inner vessel being divided into an upper chamber and a lower chamber by a separator wall between the outer wall of said inner vessel, the separator wall having a bottom portion to receive a product to be brewed and with a drain hole disposed therein and a vent portion with an aperture therein extending outwardly into said upper chamber below the top of the outer wall of said inner vessel, a space being formed between the outer walls of said inner and outer vessels, the outer wall of said inner vessel having a concave portion extending along the vertical length of said inner vessel to permit pouring therethrough an annular passage between said lower chamber and the space between said inner and outer vessels being defined between said inner vessel bottom edge and said annular trough; a thermostat disposed adjacent said bottom wall of said outer vessel to sense the temperature thereof; a high wattage heating element disposed adjacent said bottom wall of said outer vessel to heat the liquid therein to boiling; a warming element disposed adjacent said thermostat to keep the liquid warm once the brewing cycle is completed, said thermostat being operative to permit energization of said high wattage heating element until said bottom wall is overheated and then cause said warming element to be energized; a cover fitting over said outer vessel and having an opening adjacent the top opening of said concave passage of said inner vessel to permit pouring, said cover having a bottom extension which extends into the aperture in said vent portion, the liquid within said lower chamber upon being heated being forced into said upper chamber to extract brew from said product therein and pass through said drain hole into said lower chamber.

2. An automatic beverage maker including, an outer vessel to contain a liquid having an outer wall, and a bottom wall raised in its central portion to provide an annular trough at its periphery, and being open at the top; a handle having a slot therein fixed to the outer wall of said outer vessel; an inner vessel to be disposed within said outer vessel, said inner vessel having an outer wall with a bottom edge received in said annular trough and with an extension thereon to fit into the slot in said handle and secure said inner and outer vessels, said inner vessel being divided into an upper chamber and a lower chamber by a separator wall between the outer wall of said inner vessel, the separator wall having a bottom portion to receive a product to be brewed and with a drain hole disposed therein and a vent portion having an aperture therein extending outwardly into said upper chamber below the top of the outer wall of said inner vessel, a space being formed between the outer walls of said inner and outer vessels, the outer walls of said inner vessel having a concave portion extending along the vertical length of said inner vessel to permit pouring therethrough, an annular passage between said lower chamber and the space between said inner and outer vessels being defined between said inner vessel bottom edge and said annular trough; a thermostat disposed adjacent said bottom wall of said outer vessel to sense the temperature thereof; a high wattage heating element disposed adjacent said bottom wall of said outer vessel to heat the liquid therein to boiling; a warming element disposed adjacent said thermostat to keep the liquid warm once the brewing cycle is completed, said thermostat being operative to permit energization of said high wattage heating element until said bottom wall is overheated and cause said warming element to be energized; a cover fitting over said outer vessel and having an opening adjacent the top opening of said concave passage of said inner vessel to permit pouring, said cover having a bottom extension which extends into the aperture in said vent portion to be held thereby; and a base member connected to the bottom of said outer vessel to seal said thermostat and said heater and warmer elements between said base member and said outer vessel.

3. An automatic beverage maker including, an outer vessel to contain a liquid having an outer wall, and a bottom wall raised in its central portion to provide an annular trough at its periphery, and being open at the top; a handle fixed to the outer wall of said outer vessel; an inner vessel to be disposed within said outer vessel and having an outer wall with a bottom edge received in said annular trough, said inner vessel being divided into an upper chamber and a lower chamber by a separator wall between the outer wall of said inner vessel, the separator wall having a concave bottom portion to receive a product to be brewed and with a drain hole disposed therein and a vent portion having an aperture therein extending outwardly into said upper chamber below the top of the outer wall of said inner vessel, a space being formed between the outer walls of said inner and outer vessels, the outer wall of said inner vessel having a concave portion extending along the vertical length of said inner vessel to permit pouring therethrough, an annular passage between said lower chamber and the space between said inner and outer vessels being defined between said inner vessel bottom edge and said annular trough; a filter disposed around said vent portion of said separator wall and over said drain hole; a thermostat disposed adjacent said bottom wall of said outer vessel to sense the temperature thereof; a high wattage heating element disposed adjacent said bottom wall of said outer vessel to heat the liquid therein to boiling; a warming element disposed adjacent said thermostat to keep the liquid warm once the brewing cycle is completed, said thermostat being operative to permit energization of said high wattage heating element until said bottom wall is overheated and then cause said warming element to be energized; and a cover fitting over said outer vessel and having an opening adjacent the top opening of said concave passage of said inner vessel to permit pouring, said cover having a bottom extension which extends into the aperture in said vent portion, the liquid within said lower chamber upon being heated being forced into said upper chamber to extract brew from said product therein and then being filtered by said filter and passing through said drain hole into said lower chamber.

4. An automatic beverage maker including, an outer vessel to contain a liquid having an outer wall, and a bottom wall raised in its central portion to provide an annular trough at its periphery and being open at the top; a handle fixed to the outer wall of said outer vessel; an inner vessel to be disposed within said outer vessel, said inner vessel having an outer wall with a bottom edge received in said annular trough, and with an extension thereon to engage said handle and secure said inner and outer vessels, said inner vessel being divided into an upper chamber and a lower chamber by a separator wall between the outer wall of said inner vessel, the separator wall having a bottom portion to receive a product to be brewed and with a drain hole disposed therein and a vent portion having an aperture therein extending outwardly into said upper chamber below the top of the outer wall of said inner vessel, a space being formed between the outer walls of said inner and outer vessels, the outer wall of said inner vessel having a concave portion extending along the vertical length of said inner vessel to permit pouring therethrough, an annular passage between said lower chamber and the space between said inner and outer vessels being defined between said inner vessel bottom edge and said annular trough; a thermostat disposed adjacent said bottom wall of said outer vessel to sense the temperature thereof; a high wattage heating element disposed adjacent said bottom wall of said outer vessel to heat the liquid therein to boiling; a warming element disposed adjacent said thermostat to keep the liquid warm once the brewing cycle is completed, said thermostat being operative to permit energization of said high wattage heating element until said bottom wall is overheated and then cause said warming element to be energized; and a cover fitting over said outer vessel and having an opening adjacent the top opening of said concave passage of said inner vessel to permit pouring, said cover having a bottom extension which extends into the aperture in said vent portion to be held thereby and a baffling ring extending downwardly from said cover to deflect liquid passing from said space between said inner and outer vessels into said upper chamber, with the liquid being forced into said upper chamber to extract brew from said product therein and pass through said drain hole into said lower chamber.

5. An automatic beverage maker including, an outer vessel to contain a liquid having an outer wall, and a bottom wall raised in its central portion to provide an annular trough at its periphery, and being open at the top; a handle fixed to the outer wall of said outer vessel; an inner vessel having an outer wall with a bottom edge received in said annular trough, and being disposed within said outer vessel, said inner vessel being divided into an upper chamber and a lower chamber by a separator wall between the outer wall of said inner vessel, the separator wall having a concave bottom portion to receive a product to be brewed and with a drain hole disposed therein and a vent portion having an aperture therein extending outwardly into said upper chamber, a space being formed between the outer walls of said inner and outer vessels, the outer wall of said inner vessel having a concave portion extending along the vertical length of said inner vessel to permit pouring therethrough, an annular passage between said lower chamber and the space between said inner and outer vessels being defined between said inner vessel bottom edge and said annular trough; a filter disposed around said vent portion of said separator wall and over said drain hole; a thermostat disposed adjacent said bottom wall of said outer vessel to sense the temperature thereof; a high wattage heating element disposed adjacent said bottom wall of said outer vessel to heat the liquid therein to boiling; a warming element disposed adjacent said thermostat to keep the liquid warm once the brewing cycle is completed, said thermostat being operative to permit energization of said high wattage heating element until said bottom wall is overheated and then cause said warming element to be energized; a cover fitting over said outer vessel and having an opening adjacent the top opening of said concave passage of said inner vessel to permit pouring, said cover having a bottom extension which extends down to the aperture in said vent portion and a baffling ring disposed intermediate the center and the outer rim of said cover and extending downwardly from said cover to deflect liquid passing inwardly from said space between said inner and outer vessels into said upper chamber, with the liquid being forced into said upper chamber to extract brew from said product therein and then be filtered by said filter and pass through said drain hole into said lower chamber; and a base member connected to the bottom of said outer vessel to seal said thermostat and said heater and warmer elements between said base member and said outer vessel.

6. An automatic beverage maker including, an outer vessel to contain a liquid having an outer wall, and a bottom wall raised in its central portion to provide an annular trough at its periphery, and being open at the top; a pouring flange extending outwardly around the top edge of the outer wall; a handle having a slot therein and being fixed to the outer wall of said outer vessel; an inner vessel to be disposed within said outer vessel, said inner vessel having an outer wall with a bottom edge received in said anngular trough, and with an extension thereon to fit into the slot in said handle and secure said inner and outer vessels, said inner vessel being divided into an upper chamber and a lower chamber by a separator wall between the outer wall of said inner vessel, the separator wall having a concave bottom portion to receive a product to be brewed and with a drain hole disposed therein and a vent portion having an aperture therein extending outwardly into said upper chamber below the top of the outer wall of said inner vessel, a space being formed between the outer walls of said inner and outer vessels, the outer wall of said inner vessel having a concave portion extending along the vertical length of said inner vessel to permit pouring therethrough, an annular passage between said lower chamber and the space between said inner and outer vessels being defined between said inner vessel bottom edge and said annular trough; a filter disposed around said vent portion of said separator wall and over said drain hole; a thermostat disposed adjacent said bottom wall of said outer vessel to sense the temperature thereof; a high wattage heating element disposed adjacent said bottom wall of said outer vessel to heat the liquid therein to boiling; a warming element disposed adjacent said thermostat to keep the liquid warm once the brewing cycle is completed, said thermostat being operative to permit energization of said high wattage heating element until said bottom wall is overheated and then cause said warming element to be energized; a cover fitting over said outer vessel and having an opening adjacent the top opening of said concave passage of said inner vessel to permit pouring, said cover having a bottom extension which extends into the aperture in said vent portion to be held thereby and a baffling ring disposed intermediate the center and the outer rim of said cover and extending downwardly from said cover to deflect liquid passing inwardly from said space between said inner and outer vessels into said upper chamber, with the liquid being forced into said upper chamber to extract brew from said product therein and then being filtered by said filter and passing through said drain hole into said lower chamber; and a base member connected to the bottom of said outer vessel to seal said thermostat and said heater and warmer elements between said base member and said outer vessel.

7. In an automatic drip-type beverage maker of the character in which a generally cylindrical inner vessel having an upper infusion chamber and a lower pressure chamber is nested substantially concentrically in a generally cylindrical outer vessel having a spout at its upper edge, and with an annular space defined between the circumferential walls of said inner and outer vessels for water to pass from said lower to said upper chamber during brewing, the improvement comprising:
   at least one of said vessels includes an indented wall portion extending for the height of said inner vessel and vertically aligned with said spout to define, with the facing wall of the other vessel, a pouring passage having a dimension, measured radially with respect to said vessels, substantially greater than the spacing between said inner and outer vessels in other portions of said annular space.

8. In a beverage maker according to claim 7:
   said outer vessel includes a bottom well raised in its center portion to provide an annular trough at its periphery,
   said inner vessel pressure chamber is downwardly open with a bottom edge adapted to be received in said annular trough; and
   means for stationarily securing said inner vessel relative to said outer vessel during a brewing operation to maintain a fixed size annular gap between said bottom edge of said pressure chamber and the facing portion of said annular trough.

References Cited by the Examiner
UNITED STATES PATENTS

| | | | |
|---|---|---|---|
| 2,143,046 | 1/1939 | Wolcox | 99—306 |
| 2,604,031 | 7/1952 | Campbell | 99—281 |
| 2,690,861 | 10/1954 | Tupper. | |
| 2,745,333 | 5/1956 | Campbell | 99—281 |
| 2,809,578 | 10/1957 | Campbell | 99—317 X |
| 2,856,844 | 10/1958 | Price | 99—281 X |
| 2,857,502 | 10/1958 | Schwaneke et al. | 99—281 X |
| 3,171,345 | 3/1965 | Deibele | 99—304 X |
| 3,184,579 | 5/1965 | Wichenberg | 99—281 X |

WALTER A. SCHEEL, *Primary Examiner.*
S. P. FISHER, *Assistant Examiner.*